(12) United States Patent
Lin et al.

(10) Patent No.: US 7,117,332 B2
(45) Date of Patent: Oct. 3, 2006

(54) WINDOW-BASED FLASH MEMORY STORAGE SYSTEM AND MANAGEMENT AND ACCESS METHODS THEREOF

(75) Inventors: Chun-Hung Lin, Hsinchu (TW); Chih-Hung Wang, Yunlin Hsien (TW); Chun-Hao Kuo, Hsinchu (TW)

(73) Assignee: Solid State System Co., Ltd., Hsinchu (TW)

( * ) Notice: Subject to any disclaimer, the term of this patent is extended or adjusted under 35 U.S.C. 154(b) by 154 days.

(21) Appl. No.: 10/632,195

(22) Filed: Jul. 31, 2003

(65) Prior Publication Data

US 2004/0024957 A1 Feb. 5, 2004

Related U.S. Application Data

(63) Continuation of application No. 09/990,392, filed on Nov. 20, 2001, now Pat. No. 6,718,430.

(51) Int. Cl.
*G06F 12/00* (2006.01)

(52) U.S. Cl. ........................ 711/168; 711/137; 712/207

(58) Field of Classification Search ................ 711/137, 711/103, 169, 168; 712/207
See application file for complete search history.

(56) References Cited

U.S. PATENT DOCUMENTS

| | | | |
|---|---|---|---|
| 5,519,847 A | 5/1996 | Fandrich et al. | ............ 711/109 |
| 5,901,086 A | 5/1999 | Wang et al. | ............ 365/185.21 |
| 6,151,247 A | 11/2000 | Estakhri et al. | ......... 365/185.11 |
| 6,272,610 B1 * | 8/2001 | Katayama et al. | .......... 711/171 |
| 6,851,026 B1 * | 2/2005 | Roohparvar | ................ 711/150 |
| 6,877,080 B1 * | 4/2005 | Roohparvar | ................ 711/167 |

FOREIGN PATENT DOCUMENTS

| | | |
|---|---|---|
| GB | 2 283 342 A | 5/1995 |
| WO | WO 00/30116 | 5/2000 |

OTHER PUBLICATIONS

Austin et al., "Zero-Cycle Loads: Microarchitecture Support ofr Reducing Load Latency", © 1995 IEEE, p. 82-92.*

* cited by examiner

*Primary Examiner*—Brian R. Peugh
(74) *Attorney, Agent, or Firm*—J.C. Patents (57) ABSTRACT

A window-based flash memory storage system and a management and an access method therefor are proposed. The window-based flash memory storage system includes a window-based region and a redundant reserved region; wherein the window-based region is used to store a number of windows, each window being associated with a number of physical blocks. The redundant reserved region includes a dynamic-link area, a window-information area, a dynamic-link information area, and an boot-information area; wherein the dynamic-link area includes a plurality of dynamic allocation blocks, each being allocatable to any window. The window-information area is used to store a specific window-information set that is dedicated to a certain window within a specific range of data storage space. The dynamic-link information area is used to record the status of the allocation of the dynamic allocation blocks to the windows.

5 Claims, 12 Drawing Sheets

| | block allocation | Physical Format 105 | | Logic Format 106 | | |
|---|---|---|---|---|---|---|
| | | block number 107 | relative block number 108 | relative logic block number 109 | logic block number 110 | relative logic sector number 111 | logic sector number 112 |
| window-based region 120 | window#0 100 | 0~511 | 0~511 | 0~511 | 0~511 | 0~16383 | 0~16383 |
| | window#1 | 512~1023 | 0~511 | 0~511 | 512~1023 | 0~16383 | 16383~32767 |
| | ... | ... | ... | ... | ... | ... | ... |
| | window#14 | 7168~7679 | 0~511 | 0~511 | 7168~7679 | 0~16383 | 229376~245759 |
| | window#15 | 7680~7999 | 0~320 | 0~320 | 7680~7999 | 0~10271 | 245760~255999 |
| redundant reserved region 121 | dynamic-link area 101 | 8000~8191 | 512~703 | | | | |
| | window-information area 102 | | | | | | |
| | dynamic-link information 103 | | | | | | |
| | boot-information area 104 | | | | | | |

FIG. 1

| Item Name | | Data Length (in bytes) |
|---|---|---|
| relative logic block number | 201 | 2 |
| window number | 202 | 2 |
| cycle counter | 203 | 1 |
| phase-lock flag | 204 | 1 |
| check sum code | 205 | 1 |
| data error flag | 206 | 1 |
| block error flag | 207 | 1 |
| error correction code | 208 | 6 |

FIG. 2

| Item Name | Data Length (in bytes) |
|---|---|
| relative block number 301 | 2 |
| relative logic sector number 302 | 2 |
| window number 303 | 2 |
| writing block cycle counter 304 | 1 |
| check sum code 305 | 1 |
| window information cycle counter 306 | 1 |
| block error flag 307 | 1 |
| error correction code 308 | 6 |

| SRAM Address | |
|---|---|
| 20 | variable 1 |
| 21 | variable 2 |
| ... | |
| 39 | variable 20 |
| ... | active window variable area 502 |
| 400 | |
| 401 | variables of reserved window#0 503 |
| ... | |
| 419 | |
| 420 | variables of reserved window#1 504 |
| ... | |
| 439 | |
| 440 | variables of reserved window#2 505 |
| ... | |
| 459 | | reserved window variable area 501

WINDOW-BASED FLASH MEMORY STORAGE SYSTEM AND MANAGEMENT AND ACCESS METHODS THEREOF

CROSS-REFERENCE TO RELATED APPLICATION

This application is a continuation of a prior application Ser. No. 09/990,392, filed Nov. 20, 2001, now U.S. Pat. No. 6,718,430 which claims the priority benefit of Taiwan application Ser. No. 90119199, filed Aug. 7, 2001.

BACKGROUND OF THE INVENTION

1. Field of the Invention

This invention relates to the field of mass storage device, and more particularly, to a window-based flash memory storage system and a management method and an access method thereof.

2. Description of Related Art

A flash memory storage system is typically composed of two main components: a flash memory unit and an access controller; wherein the flash memory unit is used for data storage, while the access controller is used to control the access operation from the CPU to the flash memory as well as manage the data storage space of the flash memory. The access controller is typically composed of a microprocessor, a ROM unit, an SRAM unit, a flash memory interface, and a CPU interface; wherein the ROM unit is used to store the program code running on the microprocessor; the SRAM unit is used to store window-related information and also serves as a data buffer between the flash memory and the CPU; the CPU interface is used to allow the access controller to communicate with the CPU; and the flash memory interface is used to allow the access controller to gain access to the data stored in the flash memory.

The data storage space of the flash memory is partitioned into a plurality of blocks, and most blocks are categorized into a number of subgroups, called windows. We use some specific blocks to record the related information of each window (hereinafter referred to as window information). In order to reduce SRAM cost, a common practice is to store all the window information in the flash memory and only a part of the window information that is essential to window operation is loaded to the SRAM.

When it is desired to perform a read/write operation on a certain window, it is required to first load the associated window information of this window into the SRAM. In the event of a sudden power failure, however, some newly-updated window information currently stored in the SRAM would be lost, and thus the flash memory still stores the old version of the window information. Consequently,.in the next operation of the same window when power is resumed to normal, the older version of the window information will be loaded to the SRAM, resulting in the use of incorrect window information.

Furthermore, when a read/write operation is to be performed on a certain sector of the active window, it would involve many stages of operations. If there are two sectors to be accessed, the currently used method is to execute the read/write operation on the first sector until all the stages are completed and then proceed to the read/write operation on the next sector. This sequential access method is undoubtedly low in efficiency. One conventional solution to this problem is to use two or more flash memory banks to perform an interleaving read/write operation to help increase the access speed. One drawback to this solution, however, is that it is limited in functionality and would have the penalty of an overly large power consumption.

SUMMARY OF THE INVENTION

It is therefore an objective of this invention to provide a window-based flash memory storage system and a management and an access method thereof, which can provide a more reliable way of loading window information and can help enhance access performance through parallel pipelined operation on the reading/writing of a number of sectors.

The window-based flash memory storage system according to the invention includes a window-based region and a redundant reserved region, wherein the window-based region is used to store a number of windows, each window being associated with a number of physical blocks. The redundant reserved region includes a dynamic-link area, a window-information area, a dynamic-link information area, and a boot-information area; wherein the dynamic-link area includes a plurality of dynamic allocation blocks, each being allocatable to any window. The window-information area includes a plurality of window information blocks, which are used to store a specific window-information set that is dedicated to a certain window. The dynamic-link information area is used to record the status of the allocation of the dynamic allocation blocks to the windows.

Further, the invention proposes a management method for the window-based flash memory storage system. The window-based flash memory storage system includes a flash memory unit having a plurality of window-information blocks, each being used to store a plurality of window-information sets, each window-information set being associated with a window. By this management method, at the start of the window-based flash memory storage system, the first step is to select a subgroup of the window-information blocks; and from the selected window-information blocks, selecting one window-information set and loading the selected window-information set into an SRAM unit. Then, the window-information set associated with a user-selected window is put into an active-window variable area of the SRAM; and when another window is switched to the active window, moving the current window-information set stored in the active-window variable area to a reserved window in the SRAM. In the event a user-selected window is unassociated with any window-information sets stored in the SRAM, one of the window-information sets is selected and a backup thereof copied to the flash memory, and the backup copy of the window-information set is replaced with a one of the window-information sets stored in the window-information block corresponding to the user-selected window to set the user-selected window as the active window.

In one preferred embodiment of the invention, the checking of whether the window-information set loaded in the flash memory is correct is based on the writing block indicator and the spare block indicator.

Moreover, the foregoing step of checking whether the content of the window-information set is based on the criteria: (1) verifying that an error correction code in the window information is correct; (2) verifying that a check sum code in the window information is correct; (3) verifying that the spare block is an erased block; (4) verifying that the contents of a logic block number, a cycle counter, and the last accessed sector in the writing block are consistent with the contents of the writing block indicator; and (5) verifying that the content of a phase-lock flag in the writing block is unequal to the value used to indicate the first blank sector in the window-information block.

If the content of the window-information set is incorrect, one preferred embodiment of the invention performs the step of looking through the previous window information sets stored in the window-information blocks for the last usable window-information set; wherein the usable window-information set is the window-information set that contains the correctable error correction code and the correct check sum code in the window-information.

Another preferred embodiment of the invention performs the step of finding all the blocks belonging to the window in the flash memory for rebuilding the window-information set.

Still moreover, the invention proposes an access method for a window-based flash memory storage system including a flash memory unit having a window-based region and a redundant reserved region and including a plurality of buffer areas. In the window information area of the redundant reserved region, each window-information set is associated with a specific window having a number of physical blocks. By this access method according to the invention, the first step is to load the window-information set of a user-selected window into an SRAM; and then find a requested sector requested by a data-access requesting component, and then loading the requested sector from the flash memory into one of the buffer areas. Next, the requested sector currently loaded in one of the buffer areas is transferred to the data-access requesting component. The foregoing two steps of transferring all the requested sectors to the data-access requesting component are performed in a parallel pipelined manner.

Furthermore, the invention proposes another access method for a window-based flash memory storage system including a flash memory unit having a window-based region and a redundant reserved region and including a plurality of buffer areas. In the window-information area of the redundant region, each window information set is associated with a specific window having a number of physical blocks. By this access method according to the invention, the first step is to transfer writing sector that is to be written into the flash memory to one of the buffer areas, and then computing for the address of the writing sector in the flash memory. Then, it is checked whether the previous read operation on the flash memory is correct; and then issuing a write-enable signal to the flash memory and then transferring the writing sector to the flash memory. The foregoing two steps of transferring all the requested sectors to the data-access requesting component are performed in a parallel pipelined manner.

In conclusion, the invention is characterized by the use of the redundant reserved region to store the related window information of each window as well as the use of Fast Buildup Method, Normal Buildup Method, and Block-by-Block Search Buildup Method to help build the required window information to quickly initiate the window-based flash memory storage system. Moreover, the invention also utilizes parallel pipelined operation to enhance the performance of read/write operations.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
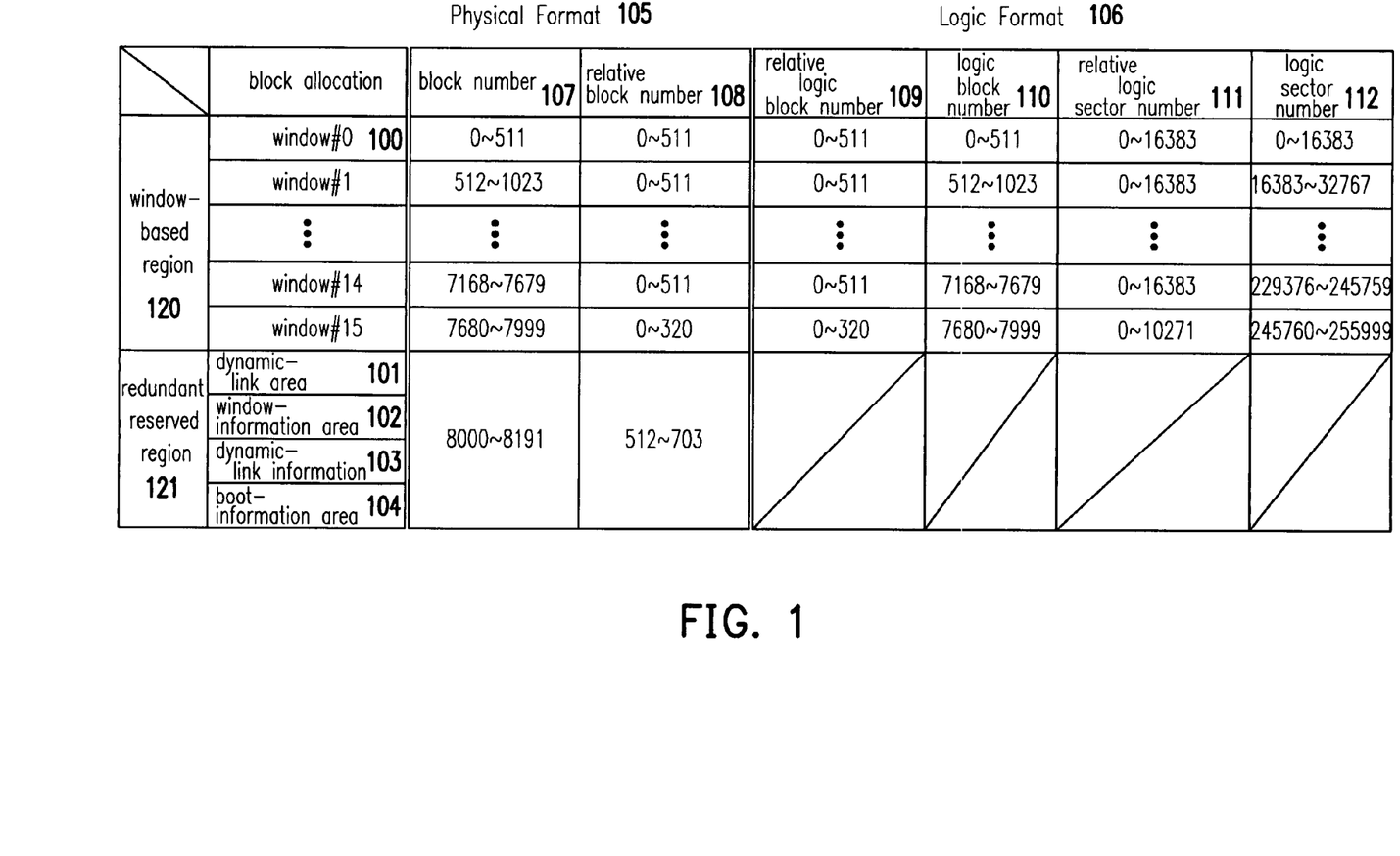
FIG. 1 is a schematic diagram showing the data structure of the flash memory in the window-based flash memory storage system according to the invention.

FIG. 1 is a schematic diagram showing the data structure of the data storage space of the flash memory unit in the window-based flash memory storage system according to the invention. As shown, the data storage space of the flash memory is partitioned into a number of blocks, and these blocks are arranged into two groups, including a window-based region 120 and a redundant reserved region 121.

The window-based region 120 includes a number of window areas, which are numbered from #0 to #15, and each of which is partitioned into 512 blocks except the last window area #15 which may not include exactly 512 blocks. The redundant reserved region 121 is partitioned into four areas: a dynamic-link area 101, a window-information area 102, a dynamic-link information area 103, and a boot-information area 104. The dynamic-link area 101 includes a number of blocks which are allocated for use by each window. In the window-information area 102, two blocks are allocated for each window to record its window information. The dynamic-link information area 103 is used to record the status of the allocation of the blocks of the dynamic-link area 101. The boot-information area 104 is used to record the locations of the dynamic-link area 101, the window-information area 102, and the dynamic-link information area 103 as well as the total number of logic sectors in the window-based flash memory storage system, and so on.

As shown in FIG. 1, the physical format 105 represents the access scheme utilized by the access controller to gain access to the flash memory; and the logic format 106 represents the access scheme utilized by the CPU to gain access to the window-based flash memory storage system. The data storage space of the flash memory is partitioned into a total of 8,192 physical blocks, each physical block being composed of 32 sectors. In the physical format 105, these physical blocks 107 are numbered from 0 to 8191, and their relative blocks 108 are clustered by 512 blocks into a plurality of subgroups. Except Window #15, each window's associated blocks are numbered from 0 to 511, and the relative blocks in the redundant reserved region 121 are numbered from 512 to 703. The logic format 106 includes a number of logic blocks 110 (which are numbered from 0 to 7999) or a number of relative logic blocks 109 (which are clustered by 512 blocks into a plurality of subgroups). Except Window #15, each window's associated logic blocks are numbered from 0 to 511. Since each logic block is composed of 32 logic sectors, the logic sectors 112 are numbered from 0 to 255999. The relative logic sectors 111 are clustered by 16384 sectors into a plurality of subgroups. Except Window #15, each window's associated logic blocks are numbered from 0 to 16383. It can be seen from FIG. 1 that the CPU's logic addressing method would be incapable of gaining access to the redundant reserved region 121.

Each window includes three kinds of blocks: data blocks, writing blocks, and spare blocks. When it is desired to perform a write operation on the previous data block, the write operation will be first directed to the writing block; and if the writing block is full and another write operation is intended, then the writing block will replace the previous data block, and the previous data block will be erased into a spare block which can be then used to serve as a writing block for another write operation.

As shown in FIG. 1, Window 0 includes a total of 512 data blocks in Window #0 100 as well as one writing block and one spare block allocated to the dynamic-link area 101. The window information of each window includes a data-block-to-logic-block mapping table, the writing block indicator, and the spare block indicator. In the case of a window having 512 data blocks, one writing block, and one spare block, it requires the use of two sectors to record all the window information of this window. These two sectors are used to record the mapping relationships between the 512 data blocks and logic blocks in their user-data area, and are further used to record the writing block indicators and the spare block indicators in their redundant area.

Figure 2:
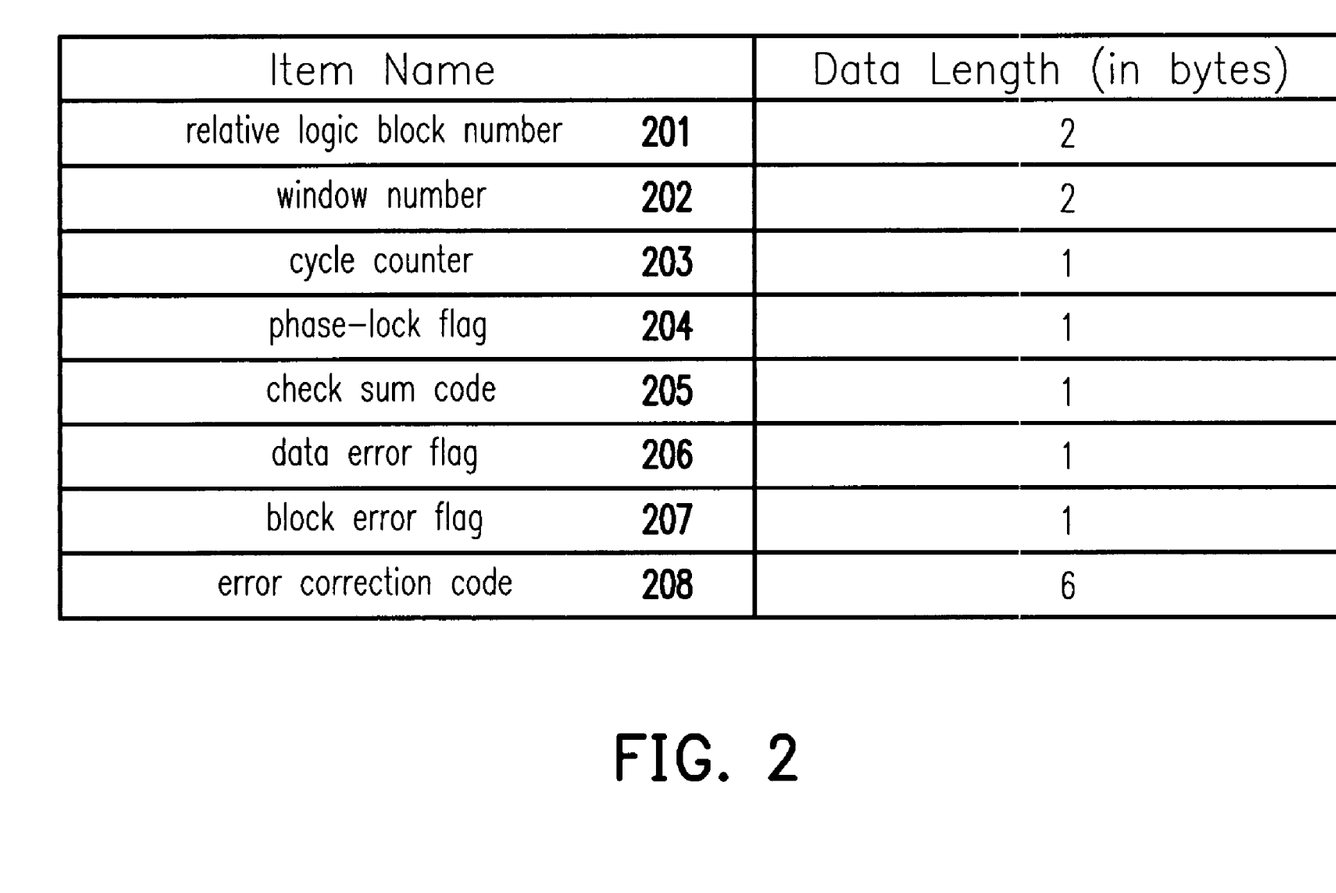
FIG. 2 is a schematic diagram showing a preferred embodiment of the data structure of the redundant area in data block or writing block.

FIG. 2 is a schematic diagram showing a preferred embodiment of the data structure of the redundant area in data block or writing block.

As shown, the Relative Block Number 301 is used to register physical location of the relative logic black number that is mapped to this block. The Relative Logic Sector Number 302 is used to indicate whether the block is a spare block (when its value is 0xFFFF) or to indicate the location of the sector that is the last one written into the writing block. The Window Number 303 is used to indicate the window that is associated with this block. The Writing-block Cycle Counter 304 is used to register the current value of the cycle counter of the writing block. The Check Sum Code 305 is used to store the check sum code excluding block error flag and the error correction code. The Window Information Cycle Counter 306 can be used to indicate which window information block contains the newest data. The Block Error Flag 307 is used to indicate whether the block is invalid. The Error Correction Code 308 is used to store the error correction code for the user-data area in the sector.

Figure 3:
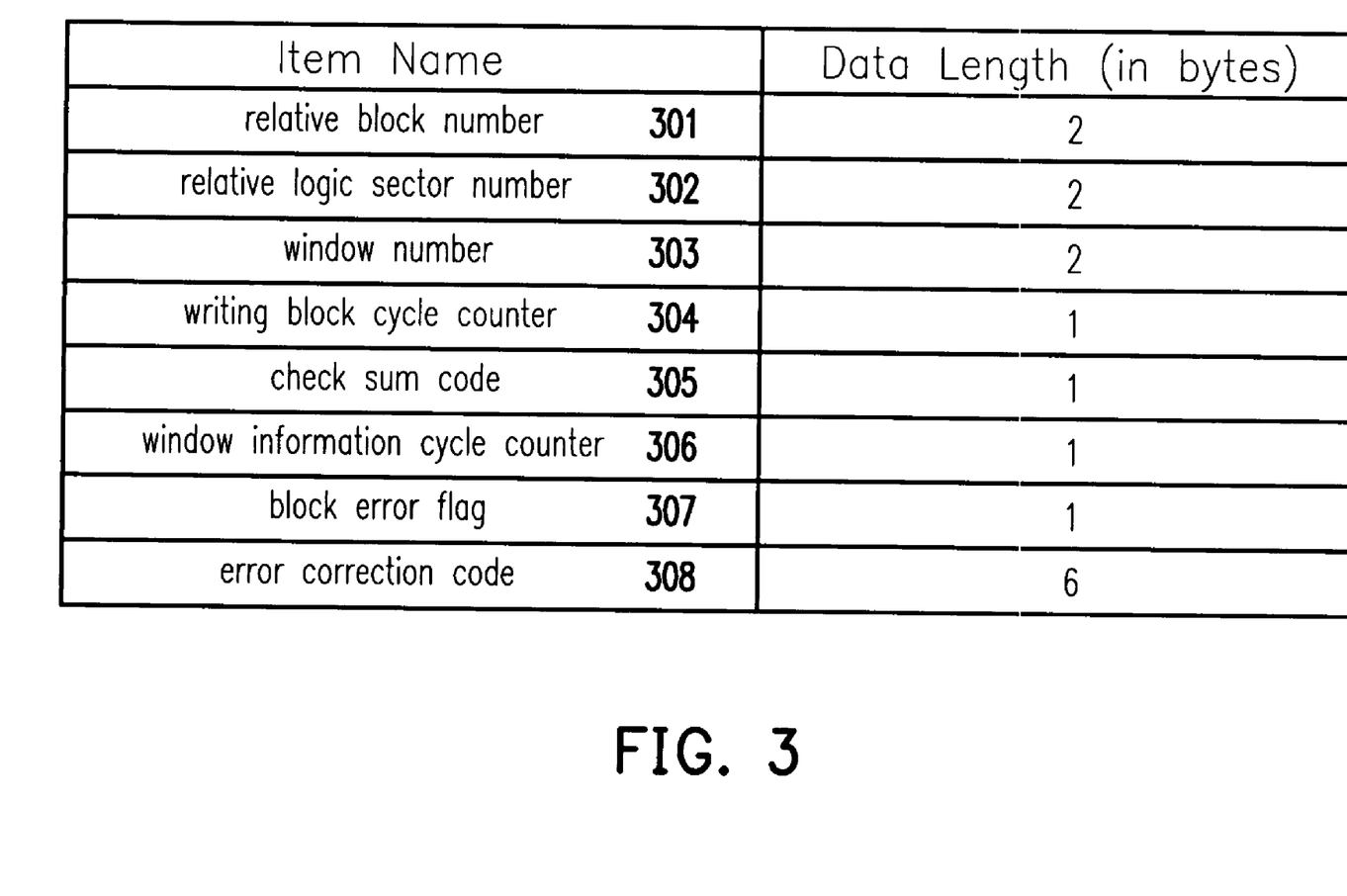
FIG. 3 is a schematic diagram showing a preferred embodiment of the data structure of the writing block indicator or spare block indicator.

FIG. 3 is a schematic diagram showing a preferred embodiment of the data structure of the writing block indicator or spare block indicator.

As shown, the Relative Block Number 301 is used to register locations of the relative logic block number that is mapped to this block. The Relative Logic Sector Number 302 is used to indicate whether the block is a spare block (when its value is 0xFFFF) or to indicate the location of the sector that is the last one written into the writing block. The Window Number 303 is used to indicate the window that is associated with this block. The Writing-block Cycle Counter 304 is used to register the current value of the cycle counter of the writing block. The Check Sum Code 305 is used to store the check sum code excluding block error flag and the error correction code. The Window Information Cycle Counter 306 can be used to indicate which window information block contains the newest data. The Block Error Flag 307 is used to indicate whether the block is invalid. The Error Correction Code 308 is used to store the error correction code for the user-data area in the sector.

Figure 4:
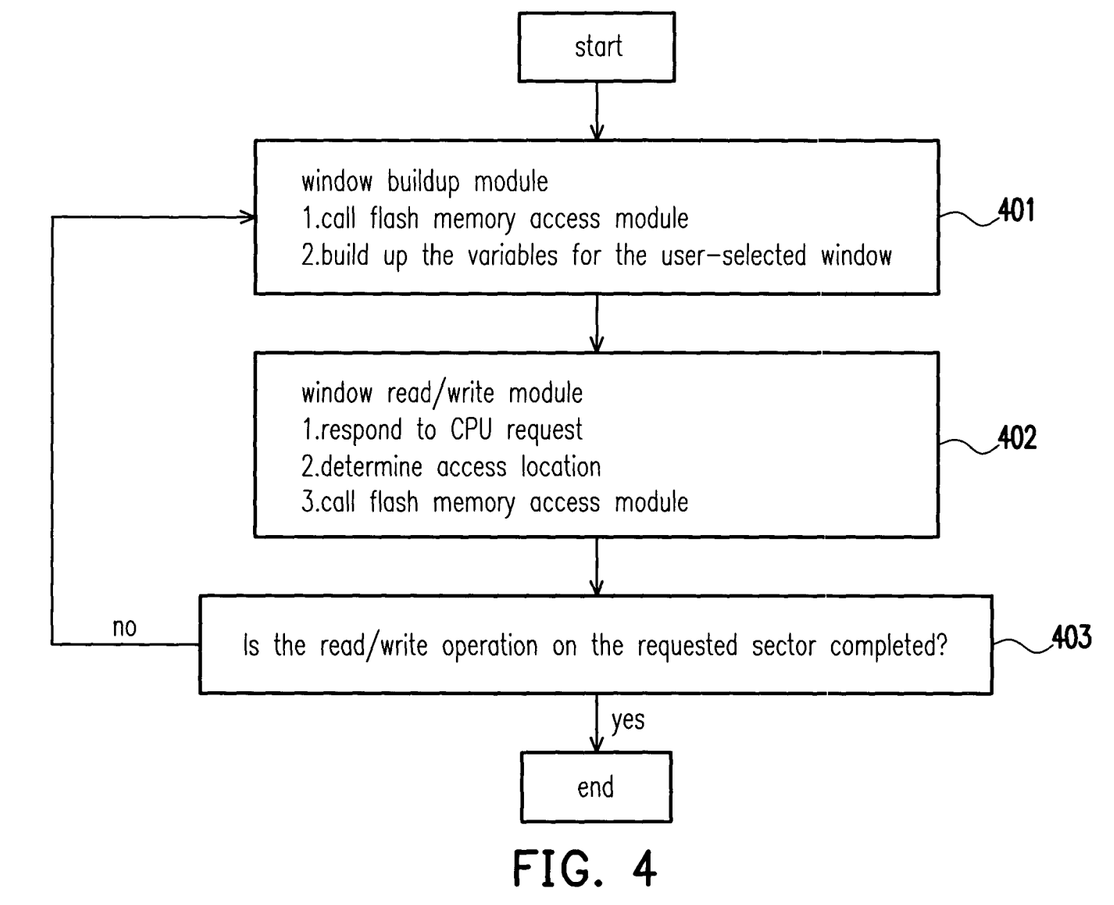
FIG. 4 is a flow diagram showing a preferred embodiment of the procedure performed by each module in the window-based flash memory storage system of the invention during read/write operation.

The access operation to the flash memory is performed by three modules: Window Buildup Module, Window Read/Write Module, and Flash Memory Access Module. The Window Buildup Module is responsible for loading the window information of user-selected window into the SRAM. The Window Read/Write Module is used to determine which block in the flash memory is to be accessed in response to the CPU's request. The Flash Memory Access Module is capable of performing direct read, write, erase, and status check operations on the flash memory in response to requests from other modules. This can help simplify the operational complexity of the other modules. For example, the flow diagram of FIG. 4 shows a preferred embodiment of the procedure performed by each module in the window-based flash memory storage system of the invention during read/write operation. As shown, the first step 401 is to execute the Window Buildup Module; the second step 402 is to execute the Window Read/Write Module; and the third step 403 is to check whether all the requested sectors have been accessed; if NO, the procedure returns to the step 401; and if YES, the procedure is ended. During this procedure, the call to the Flash Memory Access Module is included in the first substep of the step 401 and the third substep of the step 402.

In the execution of the Window Buildup Module, the primary concern is to effectively manage all the windows stored in the SRAM. To reduce the time of switching between different windows in the flash memory and the SRAM, it is required to load at least two window-information sets associated with two windows being switched. Although the loading of a larger number of window-information sets would reduce the switching time, it would undesirably increase SRAM cost. In one preferred embodiment of the invention, three window-information sets are loaded, which should include the window-information set associated with Window #0 since Window #0 is functionally related to the DOS file system operation.

Figure 5:
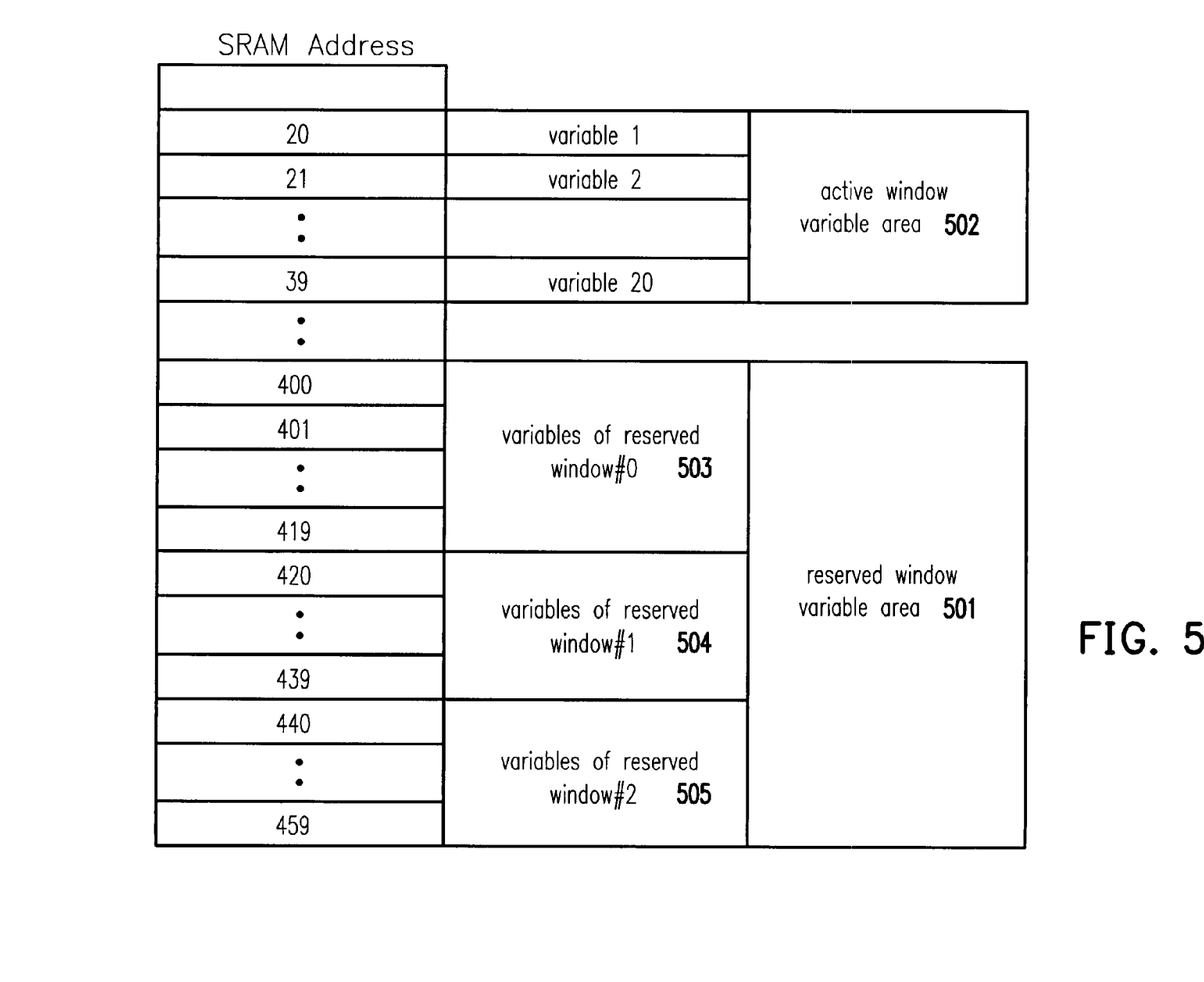
FIG. 5 is a schematic diagram showing a preferred embodiment of the architecture of the active window and the reserved window in the SRAM.

The window information loaded from the flash memory to the SRAM includes the writing block indicator and spare block indicator (hereinafter referred to as window variables). These window variables would be frequently accessed during the operation of the window-based flash memory storage system; and therefore, in order to reduce the complexity of software program and enhance the operational efficiency of the program code, it is a common practice to allocate these window variables to fixed locations. For example, as shown in FIG. 5, the SRAM addresses 400–459 are defined as a reserved window-variable area 501 for the allocation of the window variables 503 of reserved window #0, the window variables 504 of reserved window #1, and the window variables 505 of reserved window #2.

When it is desired to switch to Window #0 as the active one, since Window #0 is currently a reserved window, it is required to move the 20-Byte window variables from the addresses 400–419 to the addresses 20–39, which are the locations in the active-window variable area 502 where the window variable 1 to window variable 20 are allocated. This action makes Window #0 become the active window. Afterwards, if it is desired to switch to Window #2 as the active window, it is required to first move the window variables of Window #0 (which are currently stored in the active-window variable area 502) back to their original locations, and then move the window variables of the reserved window #2 to the active-window variable area 502, which makes window #2 become the active window. In programming, the switching between the windows only requires the moving of the window variables 1–20, so that it can help reduce the complexity of the required program code and thus enhance the overall operating efficiency of the window system.

When the user-selected window is not a reserved one, it is then required to first move the active window back to the reserved-window area, and then choose a reserved window and make a backup copy of it to the flash memory, and finally load the window variables of the user-selected window to the active-window variable area 502. Apparently, this backup scheme would not guarantee that the next use of the window information in the flash memory would be normal. There exists therefore a need for a solution that allows correct window information set to be loaded in SRAM in the next use of the window information in the flash memory.

The invention provides three ways to solve the above-mentioned problem: (A) Fast Buildup Method; (B) Normal Buildup Method; and (C) Block-by-Block Search Buildup Method.

(A) Fast Buildup Method

This method is capable of judging fast whether the current window information set stored in the flash memory is correct based on the following criteria:

(1) the error correction code in the window information sector is correct;

(2) the check sum code in the window information sector is correct;

(3) the spare block indicated by the Spare Block Indicator is a block that was previously erased;

(4) the writing block indicated by the Writing Block Indicator contains logic block number, cycle counter, and information about the last written sector which are consistent with the data registered in the Writing Block Indicator; and (5) the writing block indicated by the Writing Block Indicator contains a phase lock flag value that is unequal to the address of the first blank sector in the window-information block related to the window.

In practice, since most of the window information is normal, it is feasible to directly load the associated window-information set into the SRAM and use this Fast Buildup Method to check whether the content of the loaded window-information set is normal. If not normal, either of the other two methods can be used to correctly load window information set into the SRAM.

(B) Normal Buildup Method

If the foregoing Fast Buildup Method is inapplicable, the Normal Buildup Method can be used instead, which looks through all the previously loaded window-information sets to find the last usable window-information set. Since the data-block-to-logic-block mapping table in the window-information set contains the information about the locations of all the associated data blocks of the window, and the Writing Block Indicator and the Spare Block Indicator contain the information about the locations of all the associated writing blocks and spare blocks of the window, all the associated blocks of this window can be found to help build up a correct window-information set for the window and load this window-information set into the SRAM.

The usable window-information set mentioned above should meet the following criteria:

(1) the data contained in the data-block-to-logic-block mapping table of the window-information set should contain no uncorrectable error correction code; and (2) the check sum code contained in the writing block indicator and spare block indicator of the window-information set is correct.

(C) Block-by-Block Search Buildup Method

An alternative method to the Fast Buildup Method is the Block-by-Block Search Buildup Method, which searches through all the probable blocks to find back those blocks belonging to the window and thus build up a new window-information set. Since the blocks of one window are uninterchangeable with the blocks of another window, the search process can be conducted only through the window number area and all the blocks that have been dynamically allocated. If a spare block is located within the dynamic-link area, it would be difficult to distinguish which window this spare block belongs to. Therefore, it is only needed to first find all the data blocks and writing blocks that are associated with this window, and then reallocate a new spare block. This allows the buildup of a normal set of window information which is then loaded into the SRAM.

Figure 6:
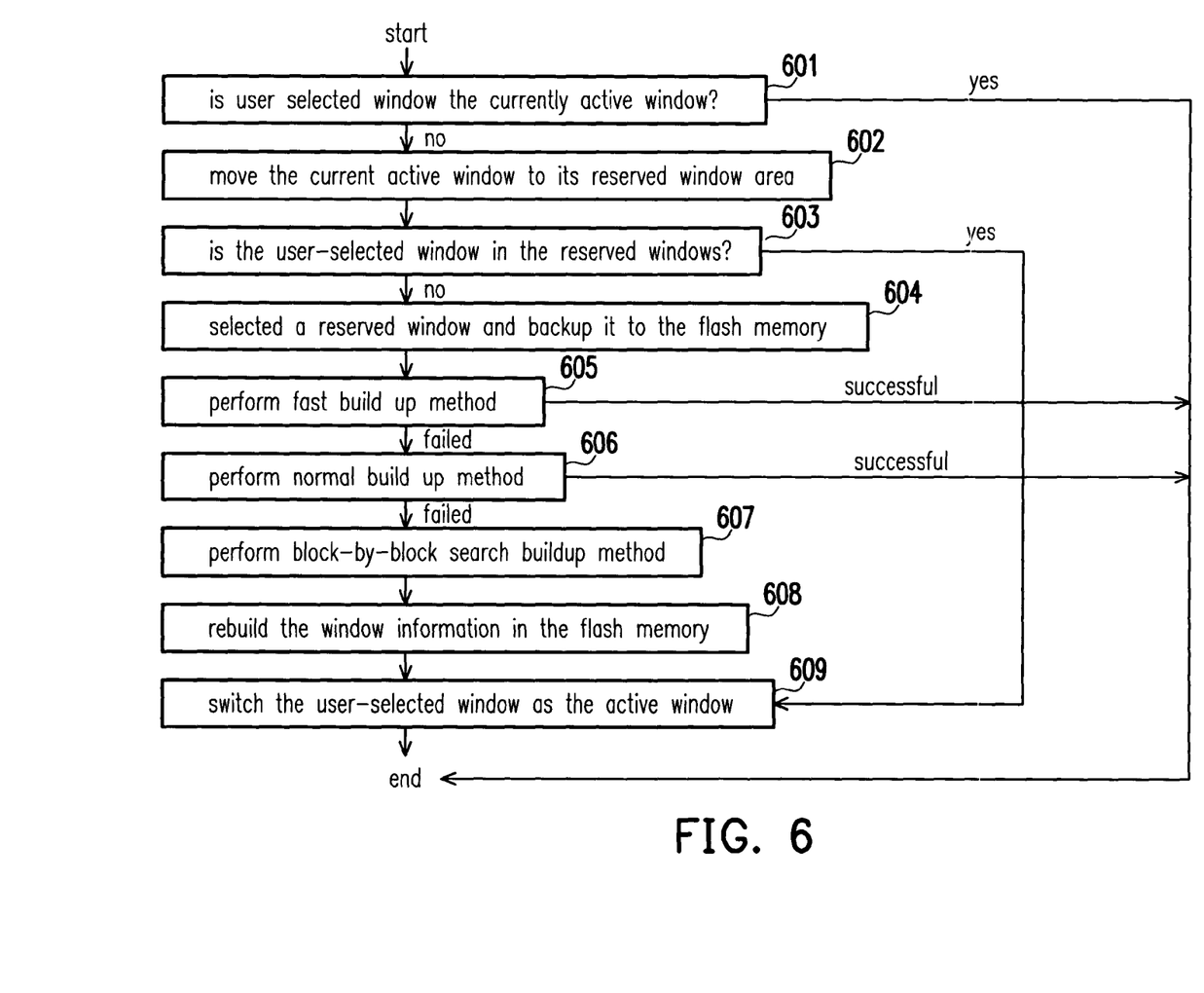
FIG. 6 is a flow diagram showing a preferred embodiment of the procedure performed by the invention when loading window information into SRAM.

FIG. 6 is a flow diagram showing a preferred embodiment of the detailed procedural steps performed by step 401, executing the Window Buildup Module shown in FIG. 4 for loading window information into SRAM. In this procedure, the first step 601 is to check whether the user-selected window is the currently active window; if YES, the window operation is directed to the currently active window; whereas if NO, the procedure goes to the next step 602 in which the currently active window is moved back to the reserved window location. The procedure then goes to the step 603, in which it is checked whether the user-selected window is one of the reserved windows; if YES, the procedure goes to the step 609 in which the user-selected window is switched to the active window; whereas if NO, the procedure goes to the step 604, in which one of the reserved windows is selected and a backup thereof is copied to the flash memory. The procedure then goes to the step 605, in which the Fast Buildup Method is used to load the window-information set of the user-selected window into the SRAM. If the loading is successful, the procedure jumps to the end; whereas if failed, the procedure goes the next step 606, in which the Normal Buildup Method is used instead. If the use of the Normal Buildup Method is successful, the procedure jumps to the end; and whereas if failed the procedure goes to the next step 607, in which the Block-by-Block Search Buildup Method is used to build up the required window information and copy a backup thereof to the flash memory. In the final step 609, the window information is loaded into the active window area of SRAM to cause the user-selected window to be switched as the active window.

Figure 7:
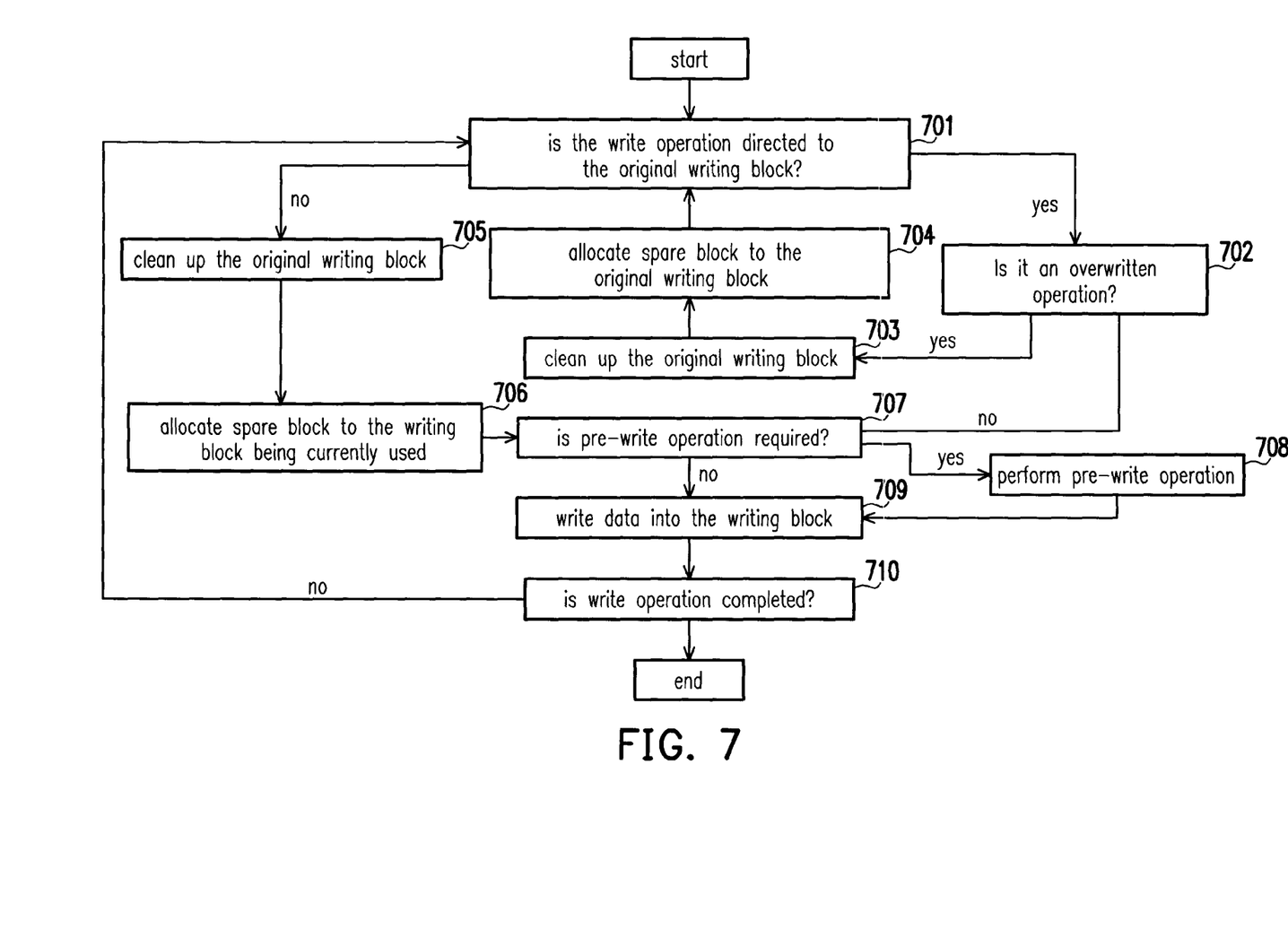
FIG. 7 is a flow diagram showing a preferred embodiment of the procedure performed by the Window Read/Write Module during a write operation.

FIG. 7 is a flow diagram showing a preferred embodiment of the detailed procedural steps performed by the step 402 shown in FIG. 4 for executing the Window Read/Write Module. The first step 701 is to judge whether the write operation is directed to the original writing block; if YES, the procedure goes to the step 702; whereas, if NO, the procedure goes to the step 705. In the step 702, it is judged whether the overwritten operation happens; if YES, the procedure goes to the step 703; whereas if NO, the procedure goes to the step 707. In the step 707, it is checked whether to perform a pre-write operation. In the step 703, the original writing block is cleaned up; and then, the procedure goes to the step 704, in which the spare block is allocated to the original writing block, and the procedure then returns to the step 701.

In the step 701, if the result is NO, the procedure goes to the step 705, in which the original writing block is cleaned up; and then the procedure goes to the step 706, in which the spare block is allocated to the currently accessed writing block; and the procedure then goes to the step 707, in which it is checked whether to perform a pre-write operation; if NO, the procedure goes to the step 709; whereas if YES, the procedure goes to the step 708, in which a pre-write operation is performed; and the procedure then goes to the step 709.

In the step 709, a write operation is performed to write data into the writing blocks. This write operation will proceed until the current writing block is full or the written data is completed. The procedure then goes to the step 710, in which it is checked whether all the data of the user-selected window have been written; if NO, the procedure goes back to the step 701; otherwise, the procedure is ended.

The cleaning up of the original writing block performed in step 703 and step 705 includes the following substeps:

(1) filling each blank sector in the writing block with the data in the data block;

(2) changing the writing block to data block (i.e., updating the content of the data-block-to-logic-block mapping table in the window information); and (3) erasing the original data block to turn it into a spare block.

The pre-write operation performed in step 707 is used to move the sector data in the data blocks that will not be written by the CPU to the writing blocks.

The step 402 shown in FIG. 4 for executing the Window Read/Write Module involves a relative simple read operation, which first checks whether the requested data are stored in the writing blocks; if YES, a read operation is performed on the writing block to read the wanted data; whereas if NO, it indicates that the requested data are stored in the data blocks.

A parallel pipelined operation is used to perform the read/write operation so as to enhance the access speed. The implementation of this parallel pipelined operation should meet the following system requirements:

(1) at least two independent buffers in hardware configuration, wherein when one buffer is used for communication with the CPU, the other buffer is capable of performing access operation to the flash memory concurrently; and (2) at least two consecutive sectors in the user-selected window that are accessed by the CPU.

The CPU's operation of reading data from a sector in the flash memory includes three stages. In the first stage, the microprocessor computes where the address of the sector in the flash memory storing the CPU's requested data is located. In the second stage, the microprocessor issues a read request to the flash memory, then waits until the flash memory is ready, and then fetches the requested data from the flash memory and puts them in the buffer. During this stage, error correction is also performed to make any necessary corrections to the data. In the third stage, a ready signal is issued to the CPU to notify the CPU that the buffer is ready to transfer data, allowing the CPU to fetch the requested data from the sector in the buffer.

Figure 8:
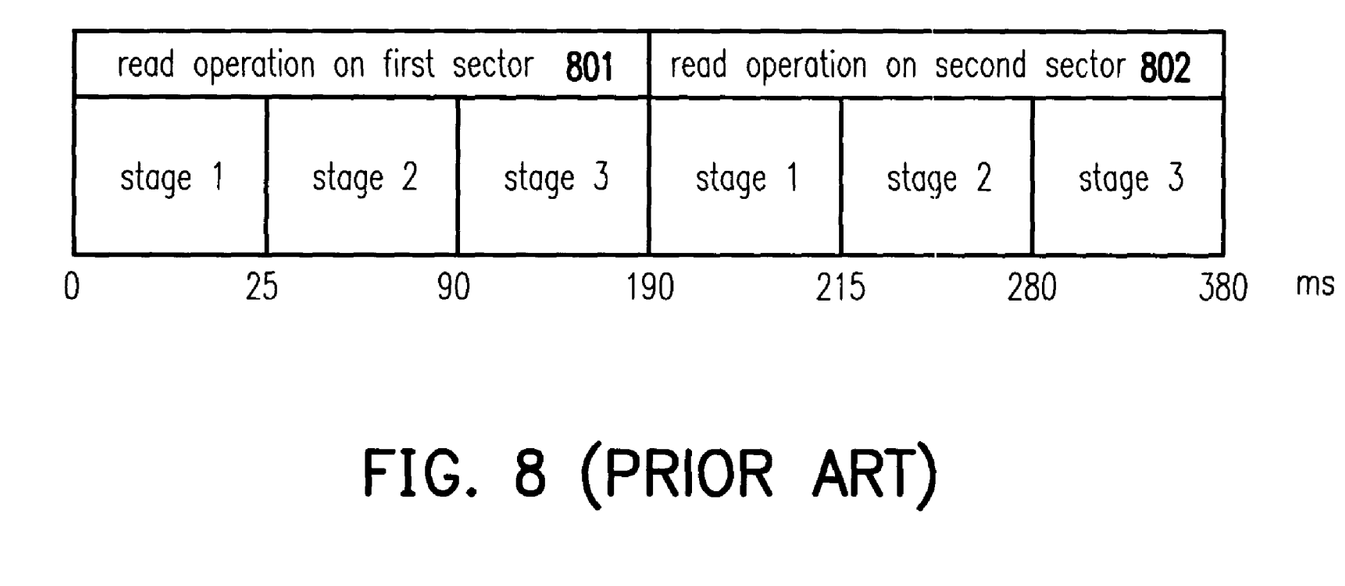
FIG. 8 is a schematic diagram showing a conventional method for reading data from sectors.

Assume the first stage of operation needs 25 ms (microseconds) to complete, the second stage of operation needs 65 ms to complete, and the third stage of operation needs 100 ms to complete. Then, the read operation on each sector requires a total of 190 ms. As shown in FIG. 8, for the read operation 801 on the first sector, it requires 190 ms to complete; and for the subsequent read operation 802 on the second sector, it also requires 190 ms to complete. Therefore, if there are a total of n sectors to be read, the overall read operation on these n sectors will require 190*n ms to complete.

Figure 9:
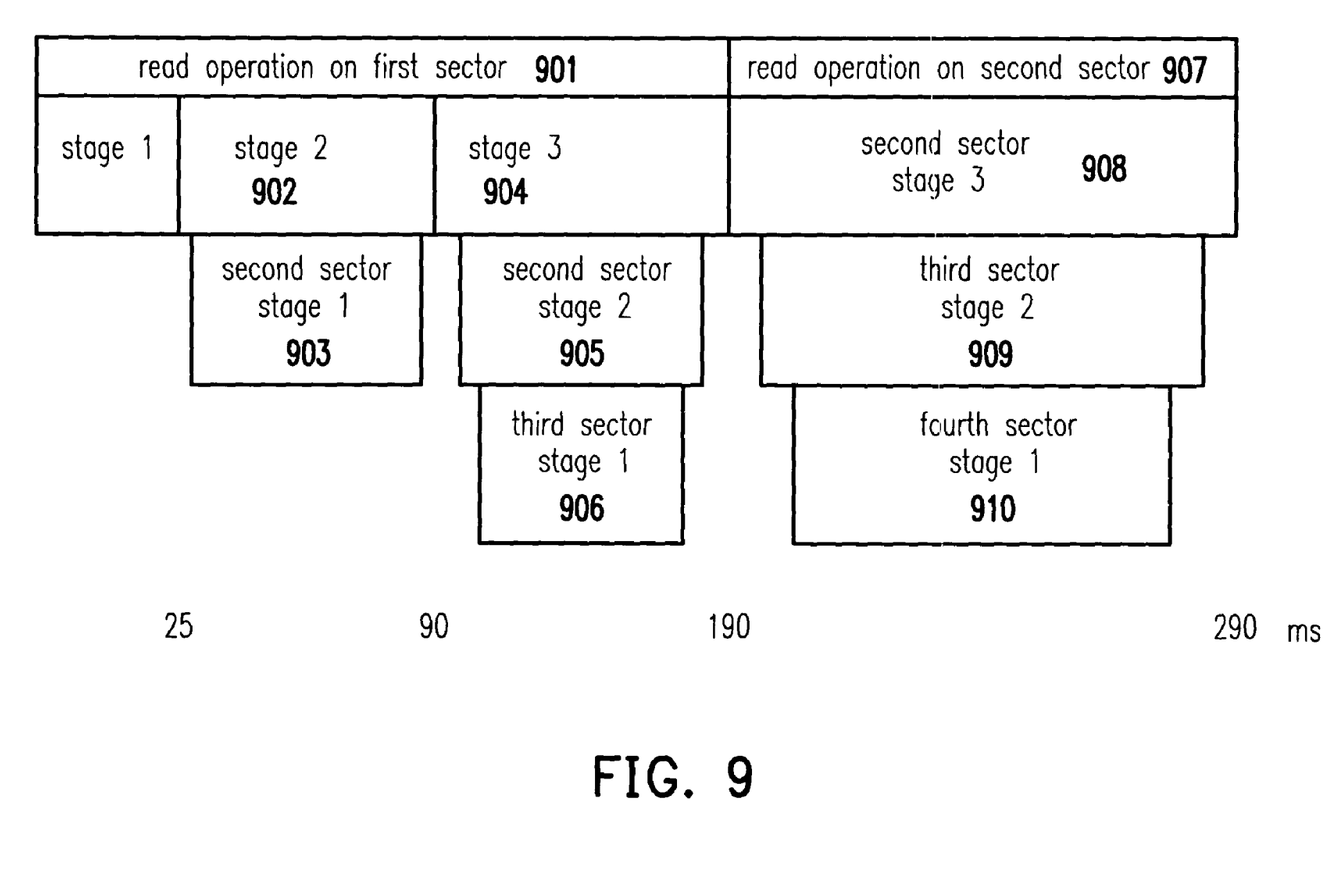
FIG. 9 is a flow diagram showing a preferred embodiment of the procedure performed by the invention for reading data from a number of sectors through a parallel pipelined operation.

FIG. 9 is a flow diagram showing a preferred embodiment of the procedure performed by the invention for reading data from a number of sectors through a parallel pipelined operation. The read operation 901 on the first sector requires three stages and 190 ms to complete. In the preferred embodiment, the stage 1 is to find a requested sector requested by data-access requesting component, and the stage 2 is to load the requested sector from the flash memory into one of the buffer areas, and the stage 3 is to transfer the requested sector loaded in the buffer area to the data-access requesting component. After the read operation 901 proceeds to the second stage 902, the first stage 903 of the read operation on the second sector is started; and after the read operation 901 proceeds to the third stage 904, the second stage 905 for the second sector and the first stage 906 for the third sector can be started one after one and onerated at the same time. As a result, the overall read operation 907 on the second sector takes just 100 ms (i.e., the complete time of the third stage). Further, after the read operation 907 on the second sector proceeds to the third stage 908, the second stage 909 of the read operation on Sector 3 and the first stage 910 of the read operation on Sector 4 are started one after one. As a result, the overall read operation on Sector 3 also takes just 100 ms. Therefore, it can be concluded that for n sectors, the overall read operation on these n sectors will take 190+100*(n−1) ms to complete.

Figure 10:
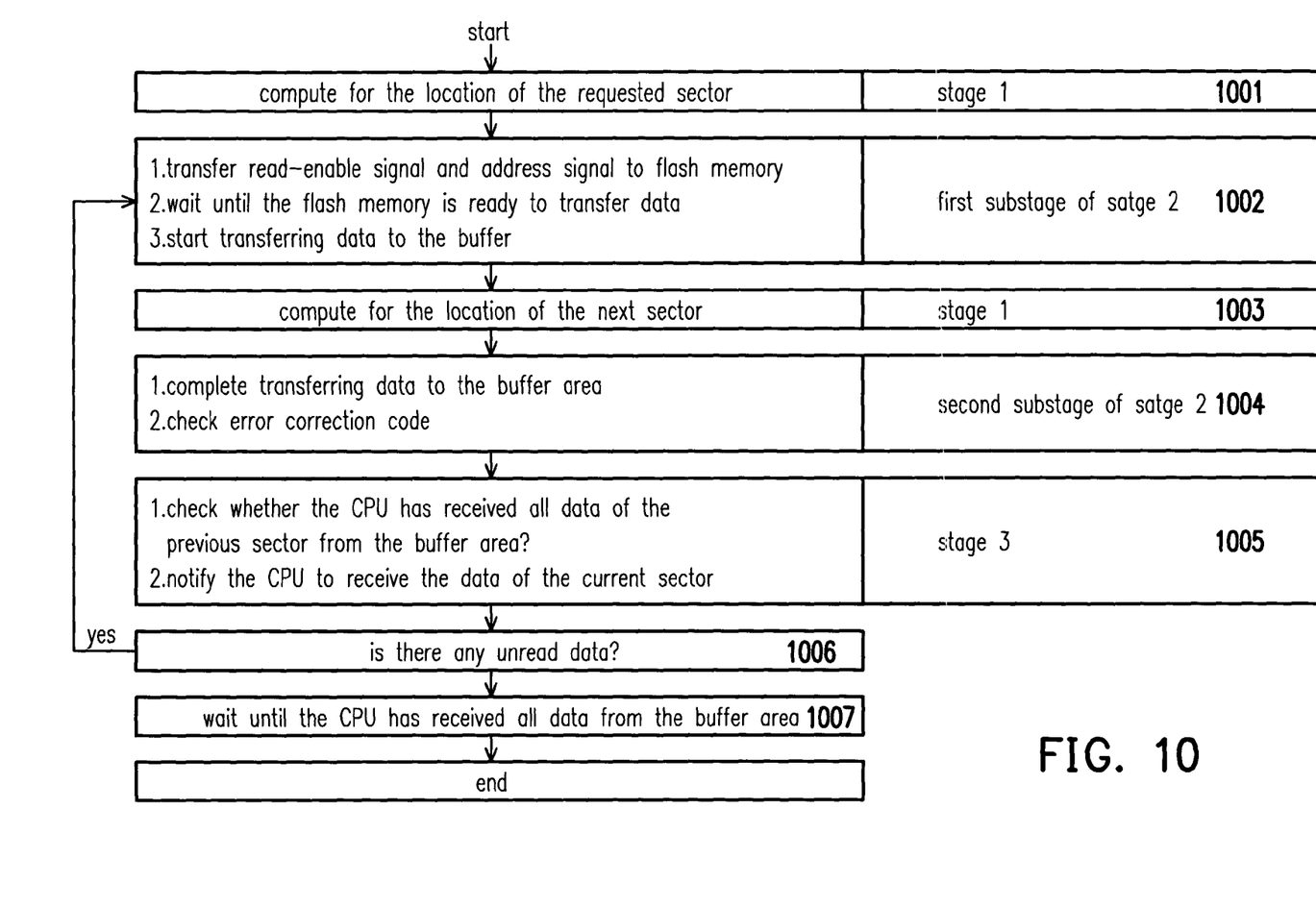
FIG. 10 is a flow diagram showing a preferred embodiment of the procedure performed by the invention for reading data through a parallel pipelined operation.

FIG. 10 is a flow diagram showing a preferred embodiment of the procedure performed by the invention for performing read operation through parallel pipelined operation. As shown, the first step 1001 is to proceed the first stage to compute for the address of the sector that is to be accessed. In the next step 1002, the second stage is started, but only the first half of procedure is carried out; and the next step 1003 is to compute for the address of the next sector that is to be accessed. In the next step 1004, the second half of the procedure of the second stage is carried out to complete the second stage of operation. In the next step 1005, the CPU is checked to see if it has received all the data from the previous sector in the buffer (if the current sector is the first sector, then this step is ignored), and then the CPU is notified to receive the data from this sector in the buffer. In the next step 1006, it is checked to see if there are still remaining data to be read; if YES, the procedure goes back to the step 1002; whereas if NO, the procedure goes to the next step 1007, the CPU proceeds to receive data from the buffer until all data are received. The procedure is then ended.

The CPU's operation of writing data from a sector into the flash memory storage system also includes three stages. In the first stage, the microprocessor issues a request to the CPU for data transfer, causing the CPU to transfer a sector of data to the buffer. In the second stage, the microprocessor computes for the address of the sector where the data are to be written into. In the third stage, the previous write operation is checked to see if all data are correctly written, and then a write request is issued to write data into the flash memory.

Figure 11:
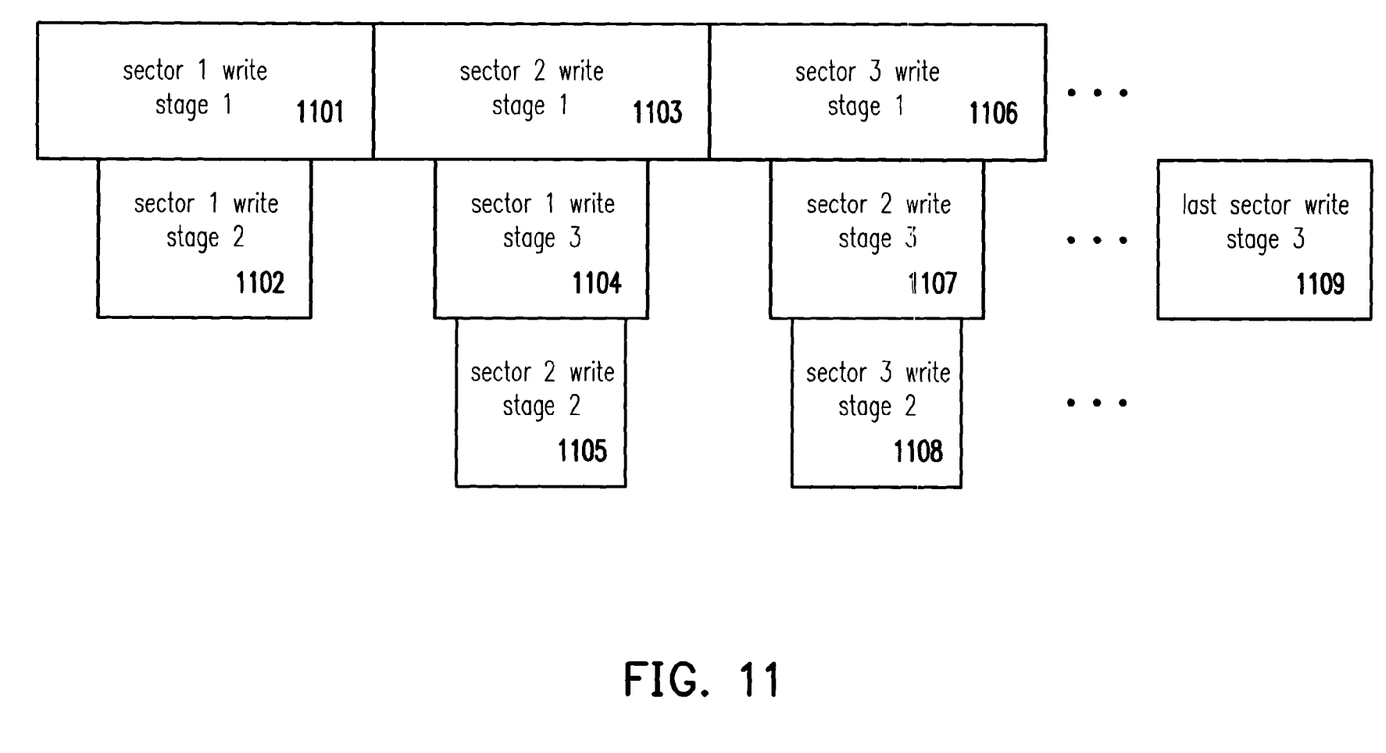
FIG. 11 is a flow diagram showing a preferred embodiment of the procedure performed by the invention for writing data to flash memory through a parallel pipelined operation.

FIG. 11 is a flow diagram showing a preferred embodiment of the procedure performed by the invention for writing data to flash memory through a parallel pipelined operation. In the preferred embodiment, the writing operation is divided into three stages. The stage 1 is to transfer a writing sector that is to be written into the flash memory to one of the buffer areas. The stage 2 is to compute for the address of the writing sector in the flash memory. The stage 3 is to check whether the previous write operation on the flash memory is correct and then transfer the writing sector in the buffer area to the flash memory. Moreover, in the preferred embodiment, the write operation on stage 1 of sector 1 (1101) proceeds to the stage 2 of sector 1 (1102) before the stage 1 (1101) is ended, and the stage 2 (1102) is ended before the stage 1 (1101) is ended, too. During the write operation on stage 1 of sector 2(1103),the stage 3 of sector 1(1104) and the stage 2 of sector 2(1105) are started one after one. The stage 2 of sector 2(1105) is ended first and then the stage 3 of sector 1(1104) and the stage 1 of sector 2(1103) are ended one after one. For example, while the sector 3(1106) is at the stage 1, the sector 2(1107) at the stage 3 can start, as well as the sector 3 (1108) at stage 2 can be proceeded at the same time. All the other stages to finish the write operation are started and then ended one after one like that. Finally, the stage 3 of the last sector(1109) is started and then ended individually.

Figure 12:
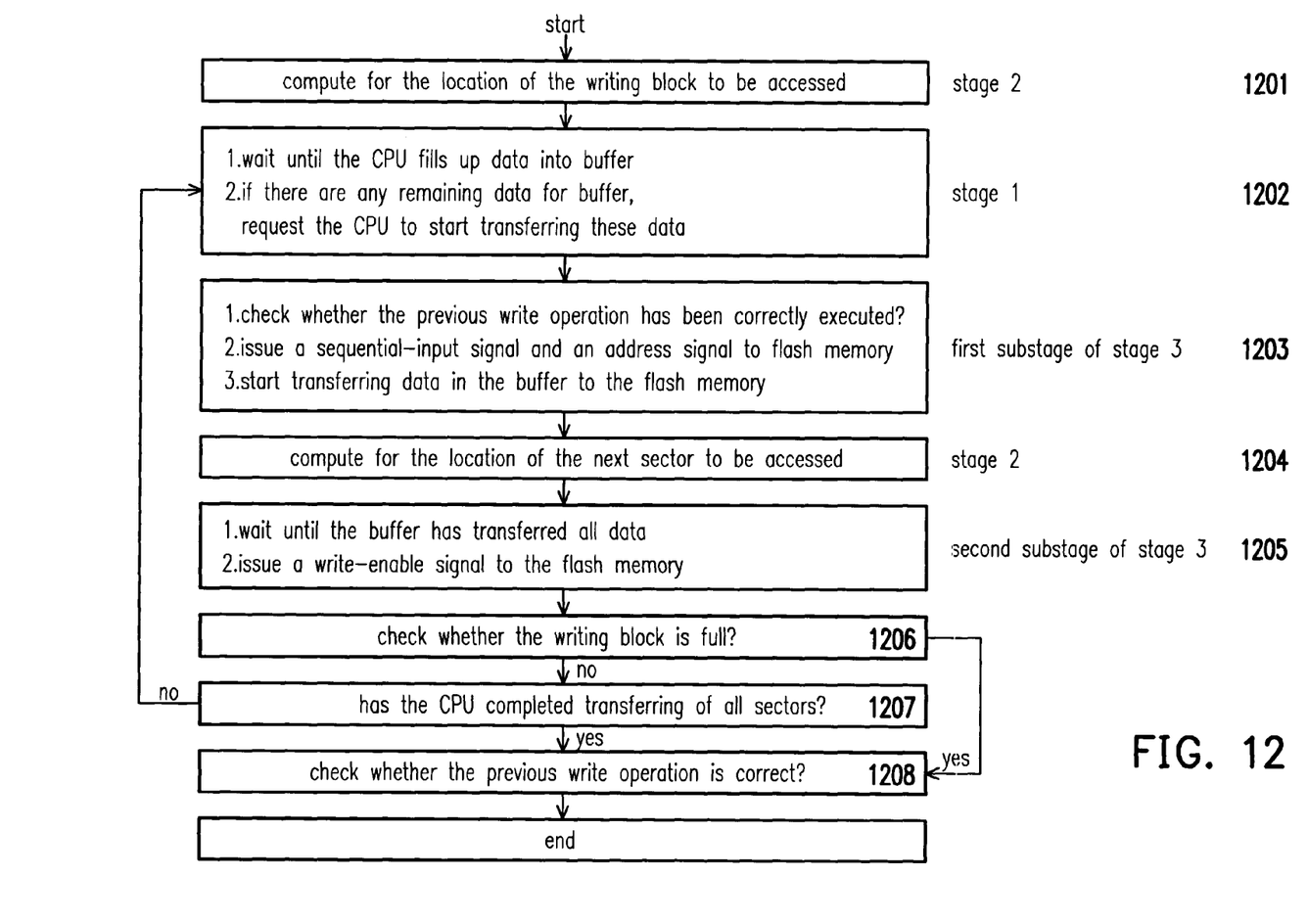
FIG. 12 is a flow diagram showing a preferred embodiment of the procedure performed by the invention for writing data through a parallel pipelined operation.

FIG. 12 is a flow diagram showing a preferred embodiment of the procedure performed by the invention for writing data through parallel pipelined operation, which shows the detailed substeps in the step 709 of the flow diagram of FIG. 7. At the start of the flow diagram of FIG. 7, the data in the first sector is transferred to the buffer. In the flow diagram of FIG. 12, the first step 1201 is to compute for the address of the sector to be accessed in the flash memory. The next step 1202 is to wait until the CPU fills up one buffer, and then it is checked whether there are remaining data that haven't been put into the buffer; if YES, the CPU continues to transfer the data of next sector to the buffer. In the next step 1203, it is checked whether the previous write operation is correctly executed (if the current sector is the first sector, then this step is ignored), and then a sequential input signal and an address signal are issued to cause the data in the buffer to be transferred to the flash memory. Then, the next step 1204 is to compute for the address of next sector in the flash memory that is to be accessed in succession to the previous sector. Then, the next step 1205 is to wait until the completion of the data transfer from the buffer to the flash memory, and then a write enable signal is issued to the flash memory. In the next step 1206, it is checked whether the writing block is full; if YES, the procedure jumps to the step 1208; whereas if NO, the procedure goes to the next step 1207. In the step 1207, it is checked whether all data have been transferred; if NO, the procedure returns to the step 1202; whereas if YES, the procedure goes to the step 1208. In the step 1208, it is checked whether the previous write operation is correctly executed; and then, the procedure is ended.

During the parallel pipeline operation, if the write operation fails to execute correctly, the following substeps are executed:

(1) stopping the parallel pipeline operation;
(2) finding a usable spare block;
(3) moving the useful sectors in the failed block to the spare block;
(4) setting the block error flag of the failed block, and replacing the failed block with the spare block obtained in step (2); and
(5) resuming the parallel pipeline operation.

In conclusion, the invention has the following advantages. The invention utilizes three methods, i.e., Fast Buildup Method, Normal Buildup Method, and Block-by-Block Search Buildup Method to load window information into SRAM, and then utilizes parallel pipelined operation to enhance the performance of read/write operations, in such a manner that the access operation on the next sector is started when the access operation on the current sector is half-completed.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A reading method to a flash memory from a data-access requesting component, wherein the flash memory includes a plurality of storage sectors, and a read operation to one sector of the storage sectors needs a plurality of stages handled by an access controller, the reading method comprising:

performing a first read operation to read a current sector of the storage sectors;
starting to perform a second read operation to a next sector of the storage sectors when the first read operation is not completed yet; and
starting to perform a third read operation to read a further next sector of the storage sectors when the first read operation and the second read operation are not completed yet,
wherein the second read operation starts before the first read operation ends thereby decreasing the time required to perform read operations and increasing overall system performance,
wherein the stages includes a first stage for finding a sector of the storage sectors to be read, a second stage for transmitting an information to be read from the flash memory into the access controller, and a third stage for transmitting an information to be read in the access controller into the data-access requesting component,
wherein the second stage for the first read operation is overlapping with the first stage for the second read operation.

2. The reading method of claim 1, further comprising recurrently performing the foregoing steps if another sector is still to be read.

3. The reading method of claim 1, wherein the third stage for the first read operation is overlapping with the second stage for the second read operation.

4. The reading method of claim 1, further comprising
starting to perform a first stage of a third read operation to find out a further next sector of the storage sectors to be read when the first read operation and the second read operation are not completed yet.

5. A reading method to a flash memory from a data-access requesting component, wherein the flash memory includes a plurality of storage sectors, and a read operation to one sector of the storage sectors needs a plurality of stages handled by an access controller, the reading method comprising:

performing a first read operation to read a current sector of the storage sectors;

starting to perform a second read operation to a next sector of the storage sectors when the first read operation is not completed yet;

starting to perform a third read operation to read a further next sector of the storage sectors when the first read operation and the second read operation are not completed yet; and starting to perform a first stage of a third read operation to find out a further next sector of the storage sectors to be read when the first read operation and the second read operation are not completed yet, wherein the second read operation starts before the first read operation ends thereby decreasing the time required to perform read operations and increasing overall system performance, wherein the stages includes a first stage for finding a sector of the storage sectors to be read, a second stage for transmitting an information to be read from the flash memory into the access controller, and a third stage for transmitting an information to be read in the access controller into the data-access requesting component, wherein the third stage of the first read operation, the second stage for the second read operation, and the first stage for the third read operation are overlapping.

* * * * *